UNITED STATES PATENT OFFICE.

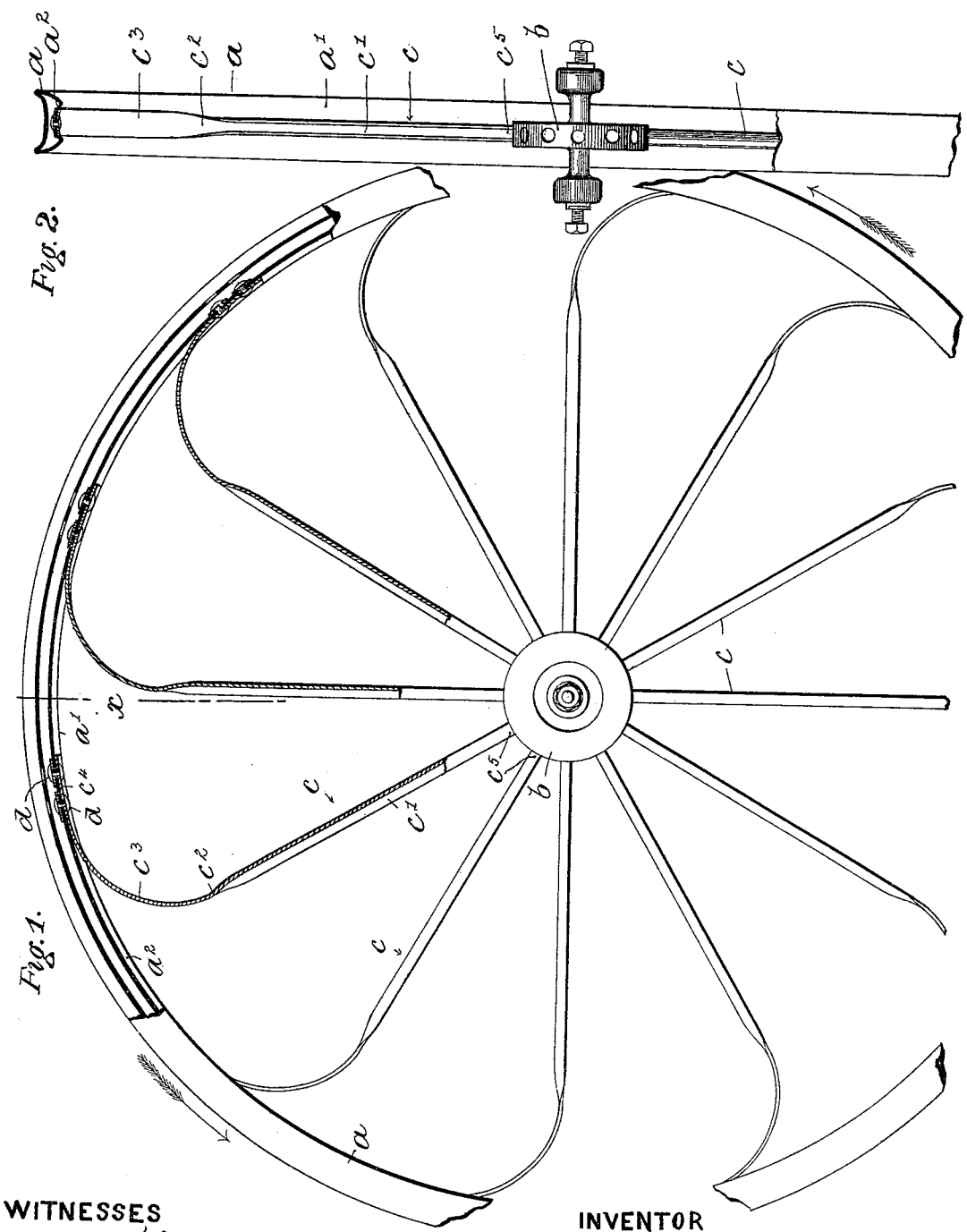

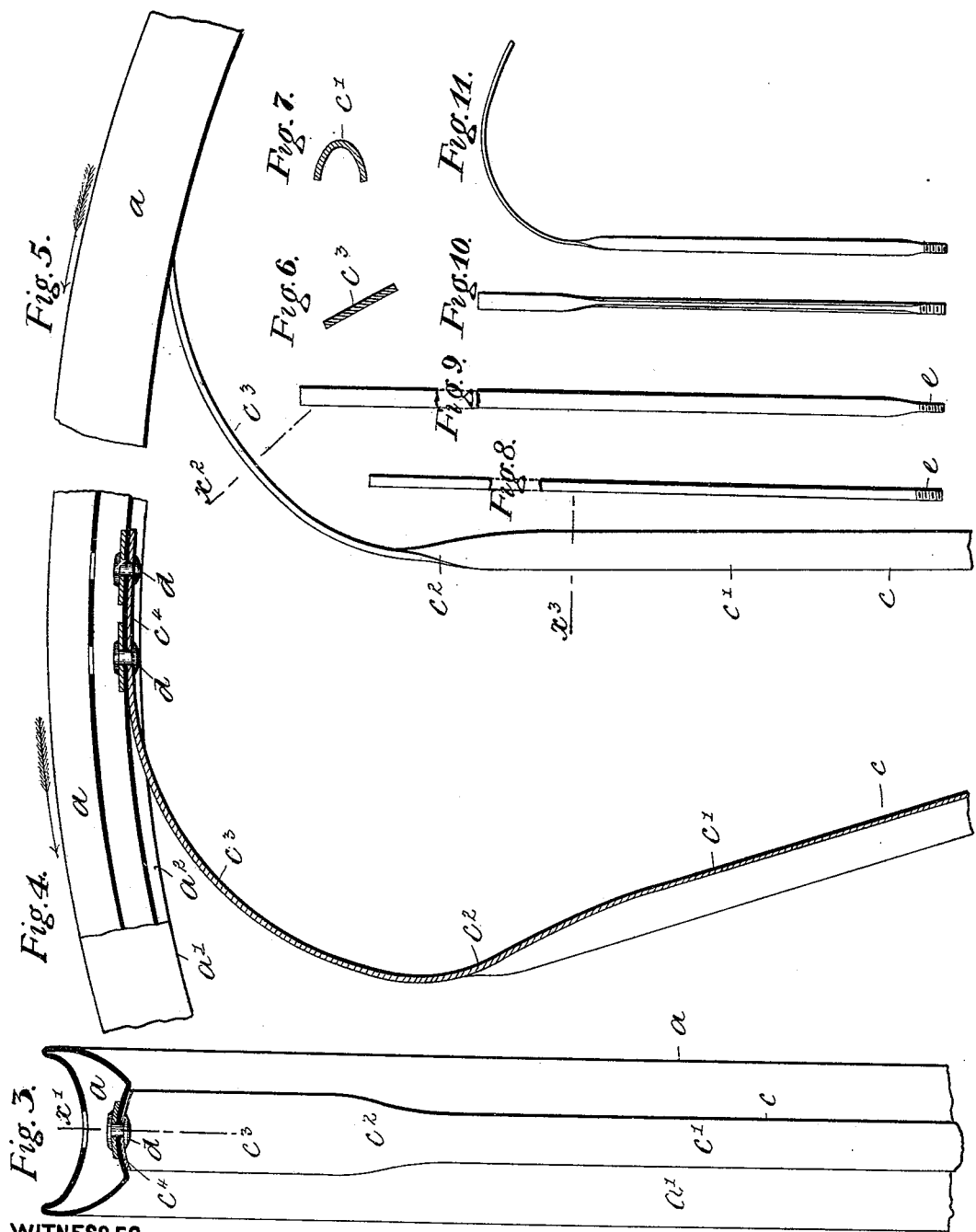

GEORGE TOWNSEND, OF HANDSWORTH, ENGLAND.

SPRING-WHEEL.

SPECIFICATION forming part of Letters Patent No. 620,061, dated February 21, 1899.

Application filed July 7, 1898. Serial No. 685,365. (No model.)

*To all whom it may concern:*

Be it known that I, GEORGE TOWNSEND, a subject of the Queen of Great Britain, residing at 152 Crompton road, Handsworth, near the city of Birmingham, England, have invented certain new and useful Improvements in Spring-Wheels, of which the following is a specification.

This invention has reference to elastic wheels for cycles, road-carriages, and other wheeled vehicles, and has for its object to provide, by the employment of an improved construction of spoke, a spring or resilient wheel adapted to neutralize vibration and principally to dispense with the necessity of employing pneumatic tires.

Figure 1 of the accompanying drawings represents an elevation, with parts in section, of a spring or resilient wheel for cycles and like light vehicles constructed according to my invention. The arrow in the said figure indicates the direction in which the said wheel would turn in traveling forward. Fig. 2 indicates a transverse vertical section of the said wheel upon the dotted line $x$. Fig. 3 represents in similar section to Fig. 2, but upon an enlarged scale, the connection of the spring end of one of the spokes with the rim of the wheel; and Fig. 4 represents the same in section upon the dotted line $x'$. Fig. 5 is an elevation of Fig. 4. The arrows on these figures indicate the direction of rotation. Fig. 6 is a cross-section of Fig. 5, upon the dotted line $x^2$, across the spring end of the spoke; and Fig. 7 is a section upon the dotted line $x^3$ of the same figure, taken through the preferably trough-sectioned or longitudinally-corrugated body of the said spoke.

The same letters of reference indicate corresponding parts in the several figures of the drawings.

The improved wheel comprises a rim or felly $a$, supported from the hub $b$ through the medium of a series of radiating spokes $c$, made from strips of sheet metal, whose shanks $c'$ are fluted in cross-section or longitudinally corrugated or channeled, so as to give rigidity thereto, while the tips or outer ends $c^2$ open out into flat beads or curved tongue-springs $c^3$, directed tangentially to the rim, with their flat sides directed horizontally and presented to the inner periphery $a'$ of the said rim, to which the terminal ends $c^4$ are secured by rivetings $d$ or otherwise and preferably lie within an annular sinking $a^2$.

The shank or inner ends $c^5$ of the spokes, which may be solid or tubular in section, are attached to the hub $b$ by screwing, brazing, riveting, pegging, or in other suitable manner. The curves of the spring-band-connection ends of the spokes rake backwardly or away from the direction of rotation of the wheel when traveling forward, whereby considerable resiliency, combined with softness of action, is attained.

The spokes are preferably made by taking a piece of stout wire or rod metal (see on a reduced scale in Fig. 8) of nearly the same length of the spoke to be made, and then, by stamping, or by a rolling process, flattening out the fore part of the same into a flat blade or strip as shown in Fig. 9. Then, by further tools, the part lying outward of the solid shank $e$ is troughed or channeled (see Fig. 10 in plan and Fig. 11 in edge view) to within a suitable distance of the other end, which is left flat to form the curved-back spring-blade connection.

I claim—

1. A vehicle-wheel, having each of its spokes formed with an integral curved spring outer end, and that portion thereof between the hub and the spring end, stiffened by a longitudinal corrugation, as and for the purpose set forth.

2. A vehicle-wheel having its spokes longitudinally corrugated adjacent to their hub ends, and their outer ends formed into flat curved springs, as and for the purpose set forth.

In testimony whereof I have hereunto set my hand in presence of two subscribing witnesses.

GEORGE TOWNSEND.

Witnesses:
N. SKERUTT,
J. E. ANDERSON.